United States Patent [19]

Kusaka

[11] Patent Number: 4,660,696
[45] Date of Patent: Apr. 28, 1987

[54] BRAKE SYSTEM FOR USE IN A CONSTRUCTION VEHICLE

[75] Inventor: Kohei Kusaka, Sayama, Japan

[73] Assignee: Kabushiki Kaisha Komatsu Seisakusho, Tokyo, Japan

[21] Appl. No.: 732,766

[22] Filed: May 10, 1985

[30] Foreign Application Priority Data

May 14, 1984 [JP] Japan ............................... 59-094515

[51] Int. Cl.$^4$ ............................................. B60K 41/26
[52] U.S. Cl. ....................................... 192/4 A; 192/9; 303/9
[58] Field of Search ............... 192/0.055, 0.094, 0.072, 192/1, 2, 3 R, 4 A, 3 S, 9; 303/9, 16, 71, 20; 361/194; 188/106 F; 180/287

[56] References Cited

U.S. PATENT DOCUMENTS

| | | | |
|---|---|---|---|
| 3,634,697 | 1/1972 | MacFarlane | 180/287 X |
| 3,982,792 | 9/1976 | Nakajima | 303/6 A |
| 3,985,210 | 10/1976 | Hodge et al. | 303/16 X |
| 4,088,208 | 5/1978 | Goode | 192/4 A |
| 4,175,635 | 11/1979 | Thomas | 180/287 |
| 4,451,865 | 5/1984 | Warner et al. | 361/194 X |

FOREIGN PATENT DOCUMENTS 2040374  8/1980  United Kingdom .................... 303/9

Primary Examiner—Rodney H. Bonck
Assistant Examiner—David A. Testardi
Attorney, Agent, or Firm—Armstrong, Nikaido, Marmelstein & Kubovcik

[57] ABSTRACT

A brake system for a construction vehicle which ensures the safety of the vehicle when it is parked on a sloping road and started again, and enables the vehicle to get away for itself from a dangerous place where it has been brought to an emergency stop. It includes a battery relay which is closed if a main switch is turned on, a parking brake switch provided with a self-holding relay, an emergency brake switch and a solenoid valve for a parking brake. The parking brake switch, emergency brake switch and solenoid valve are connected in series to a power source via the battery relay one after another. The system may further include a parking brake relay connected between the battery relay and the solenoid valve and adapted to close if the emergency brake switch is closed when an electric current can flow through the parking brake switch, and a neutralizer relay connected between the battery relay and a direction circuit for a transmission gear in the vehicle and adapted to close when an electric current can flow through the parking brake switch.

4 Claims, 13 Drawing Figures

DIRECTION CIRCUIT FOR TRANSMISSION GEAR

DIRECTION CIRCUIT FOR TRANSMISSION GEAR

BRAKE SYSTEM FOR USE IN A CONSTRUCTION VEHICLE

BACKGROUND OF THE INVENTION

1. Field of the Invention

This invention relates to a brake system for a construction vehicle, and more particularly, one including a parking brake and an emergency brake.

2. Description of the Prior Art

In a conventional brake system of the type to which this invention pertains, a parking brake is automatically actuated when a main switch (start switch) is turned off to stop the operation of an engine, even if a parking switch has been turned on to deactivate the parking brake. If the main switch is, then, turned on to start the engine, the parking brake is automatically deactuated. Therefore, a dangerous accident is likely to result from the erroneous operation of the brake system when the vehicle is parked in a sloping road or place.

The conventional brake system permits the vehicle to run even with the parking brake on. It is, therefore, often the case that the driver of the vehicle does not take the trouble to take off the parking brake, but allows the brake lining to burn.

Moreover, the conventional brake system allows the transmission gear in the vehicle to shift to its neutral position automatically if the emergency brake is actuated. This feature involves the possibility of a serious accident, since it is, for example, likely that the vehicle may be unable to get away for itself if it is brought to an emergency stop on a railroad crossing.

SUMMARY OF THE INVENTION

Under these circumstances, it is an object of this invention to provide a brake system for a construction vehicle in which a parking brake is actuated automatically if a main switch is turned off, and in which, even if the main switch is turned on, the parking brake is not deactuated unless a parking brake switch is turned on after it has once been turned off.

It is another object of this invention to provide a brake system for a construction vehicle in which, if a parking brake is actuated, a transmission gear in the vehicle is shifted to its neutral position automatically to disable the vehicle to start.

It is still another object of this invention to provide a brake system for a construction vehicle which enables the vehicle to operate at a variable speed so that it may be able to get away from a dangerous place for itself even if an emergency brake is actuated.

According to a first aspect of this invention, the first object hereinabove stated is attained by a brake system for a construction vehicle comprising a battery relay having a first solenoid which is energized to place the relay in operation if a main switch is turned on, an emergency brake switch and a solenoid valve for a parking brake which are connected in series to a power source via the battery relay one after the other, a parking brake switch connected in series between the battery relay and the emergency brake switch for energizing, when it is turned on, the solenoid valve for the parking brake to deactuate the parking brake, and a holding relay having a second solenoid which is energized to place the holding relay in operation to hold the parking brake switch in an energizable state when the parking brake switch is turned off.

According to a second aspect of this invention, the objects hereinabove stated are attained by a brake system for a construction vehicle comprising a battery relay having a first solenoid which is energized to place the relay in operation if a main switch is turned on, an emergency brake switch and a solenoid valve for a parking brake which are connected in series to a power source via the battery relay one after the other, a parking brake switch connected in series between the battery relay and the emergency brake switch for energizing, when it is turned on, the solenoid valve for the parking brake to deactuate the parking brake, a holding relay having a second solenoid which is energized to place the holding relay in operation to hold the parking brake switch in an energizable state when the parking brake switch is turned off, a parking brake relay connected between the battery relay and the solenoid valve for the parking brake and having a third solenoid which is energized if the emergency brake switch is turned on when the parking brake switch is on, and a neutralizer relay connected between the battery relay and a direction circuit for a transmission gear in the vehicle and having a fourth solenoid which is energized when the parking brake switch is on.

Other objects, features and advantages of this invention will become apparent from the following description and the accompanying drawings.

DETAILED DESCRIPTION OF THE PREFERRED EMBODIMENTS

Figure 1:
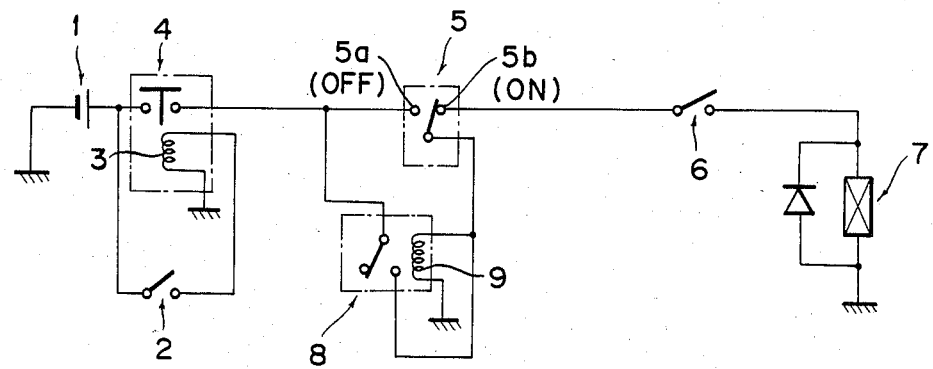
FIG. 1 is a block diagram of a brake system embodying this invention.

A brake system for a construction vehicle basically comprises a parking brake switch provided in the vicinity of a dashboard in front of the driver's seat, a solenoid valve for a parking brake which is provided at the front or rear end of the vehicle and energizable by the parking brake switch, and an emergency brake switch provided in a wet tank.

Referring first to FIGS. 1 to 5, a brake system embodying this invention as a first embodiment includes a battery relay 4 connected to a power source 1, such as a battery, and having a first solenoid 3 which is energized if a main switch (start switch) 2 is turned on. A parking brake switch 5, an emergency brake switch 6 and a solenoid valve 7 for a parking brake are connected in series to the power source 1 via the battery relay 4 one after another. A holding relay 8 is connected in parallel between the battery relay 4 and the parking brake switch 5 for holding the parking brake switch 5 in its position in which an electric current flows therethrough. The holding relay 8 has a second solenoid 9 which is energized if the parking brake switch 5 is manually turned to an OFF contact 5a. When the solenoid 9 is energized, the relay 8 is set in operation.

Figure 2:
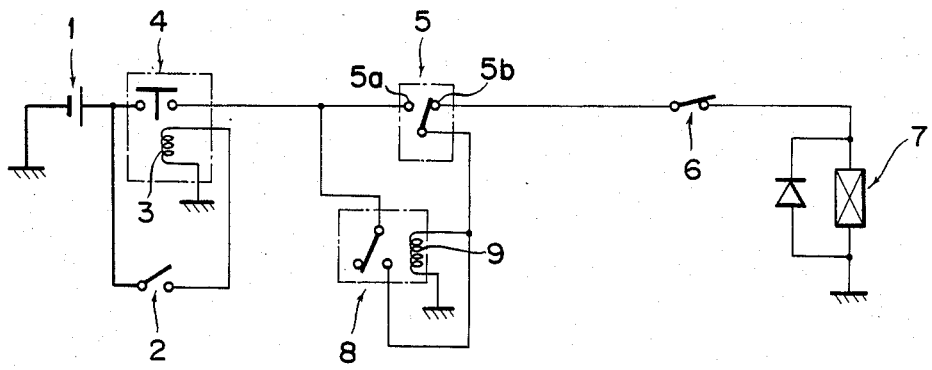
FIGS. 2 to 5 are block diagrams showing the operation of the brake system shown in FIG. 1.

The operation of the brake system hereinabove described will be described with reference to FIGS. 2 to 5. FIG. 2 shows the parking brake switch 5 which has been manually turned to an ON contact 5b. This is the position of the switch 5 in which it enables the deactuation of the parking brake. In this condition, when the main switch 2 is turned off manually, the battery relay 4 is not set in operation. Accordingly, an electric current flows only a path which is shown by a thick line in FIG. 2. As no current flows to the solenoid valve 7 for the parking brake, the parking brake continues to function.

Figure 3:
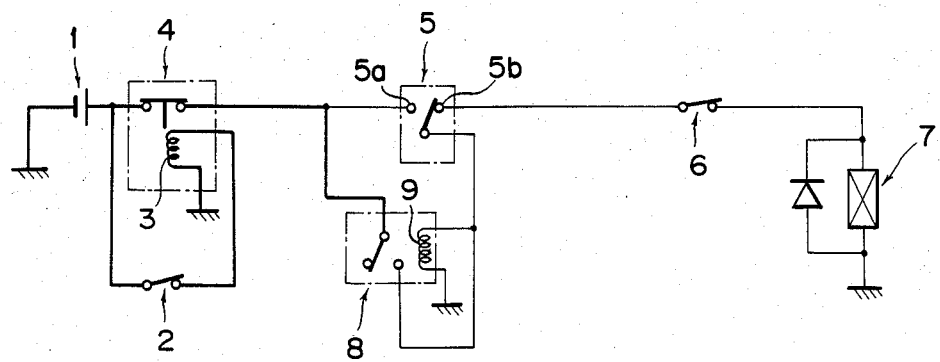
Figure 4:
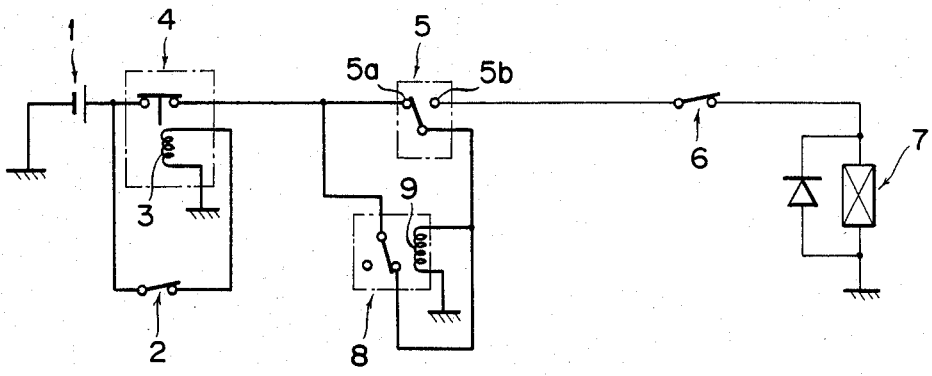
Figure 5:
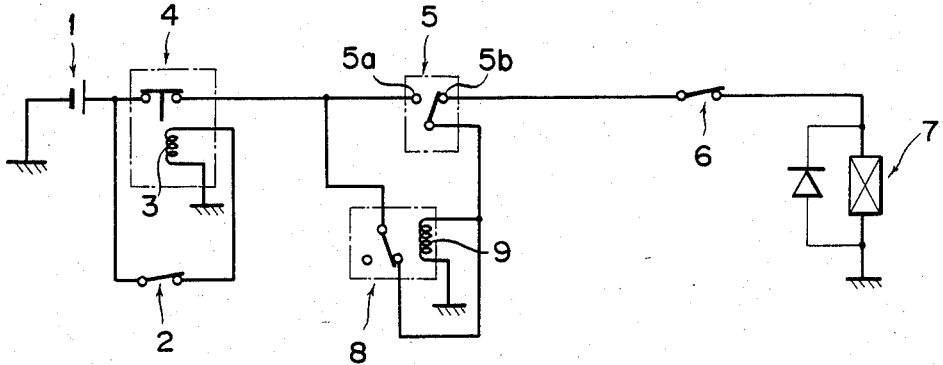

If the main switch 2 is turned on manually, the first solenoid 3 in the battery relay 4 is energized to set it in operation and an electric current flows along a path which is shown by a thick line in FIG. 3. As no current flows to the solenoid valve 7, the parking brake still continues to function.

The parking brake switch 5 is, then, turned manually to the OFF contact 5a. This is the position in which the switch 5 enables the actuation of the parking brake. If it is turned to the OFF contact 5a, the solenoid 9 is energized to set the holding relay 8 in operation so that it may form a self-holding circuit. An electric current flows along a path which is shown by a thick line in FIG. 4. As no current flows to the solenoid valve 7 as yet, the parking brake still continues to function.

The parking brake switch 5 is, then, turned manually to the ON contact 5b again. As the holding relay 8 is held in operation, an electric current flows along a path which is shown by a thick line in FIG. 5, and energizes the solenoid valve 7, whereupon the parking brake is deactuated.

According to the brake system of FIGS. 1 to 5, the parking brake is actuated automatically if the main switch is turned off, and even if the main switch is turned on, the parking brake is not deactuated unless the parking brake switch is turned on after it has once been turned off, as hereinabove described. Therefore, it ensures the safe parking of the vehicle on a sloping road or place.

Figure 6:
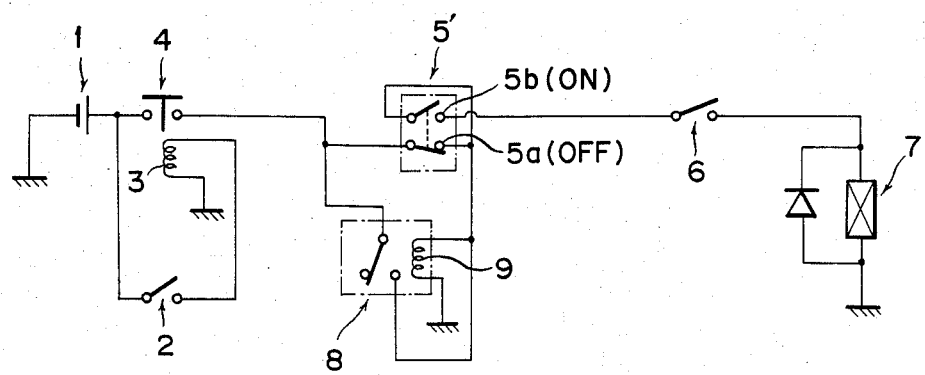
FIG. 6 is a block diagram showing a modified form of the brake system shown in FIG. 1.

A modified form of the brake system hereinabove described is shown in FIG. 6. It differs therefrom only in that it includes a parking brake switch 5' of the interlocking type having four contacts and two contact pieces. Otherwise, it is identical to the brake system of FIG. 1 both in construction and in operation. No further description is, therefore, made of the brake system shown in FIG. 6.

Attention is now directed to FIGS. 7 to 10 showing a brake system according to another embodiment of this invention. It includes a number of parts or elements which are identical in function to their counterparts in the brake system of FIG. 1. They are indicated by the same reference numerals or alphanumerics as those which are used in FIG. 1 to designate their counterparts, and no repeated description is made. The following is a description of only those parts or elements which are unique to the brake system of FIGS. 7 to 10.

A parking brake relay 10 is connected between the battery relay 4 and the solenoid valve 7 for the parking brake. The relay 10 has a third solenoid 11 which is energized if the parking brake switch 5, emergency brake switch 6 and holding relay 8 are turned on, and when it is energized, the relay 10 is set in operation. A neutralizer relay 12 is connected between the battery relay 4 and a direction circuit for a transmission gear in the vehicle. The relay 12 has a fourth solenoid 13 which is energized if the parking brake switch 5 and the holding relay 8 are set in operation. When it is energized, the relay 12 is set in operation. If the relay 12 is set in operation, an electric current is supplied to the direction circuit so that a clutch in the transmission gear may be brought to an engageable position even if the parking brake continues to function.

Figure 7:
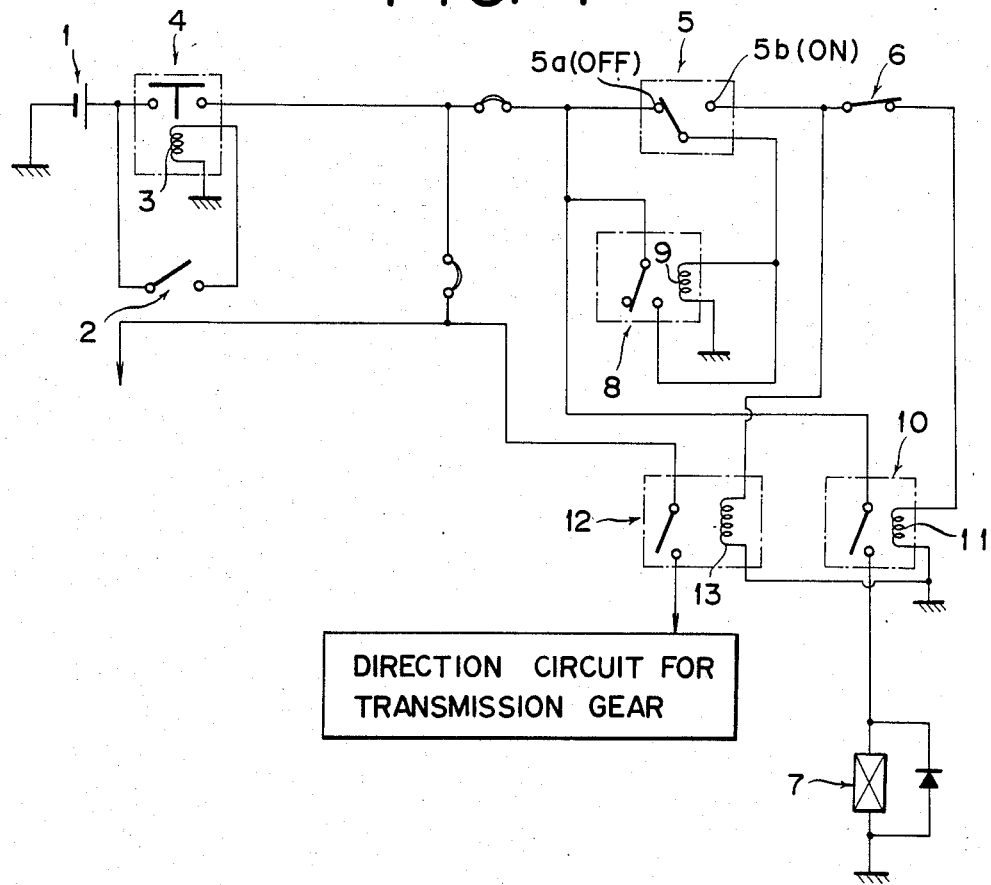
FIG. 7 is a block diagram of another brake system embodying this invention.

The operation of the brake system shown in FIG. 7 will be described with reference to FIGS. 8 to 10. No detailed description will be made of those phases of operation which are common to both of the systems shown in FIGS. 1 and 7. In FIG. 7, the main switch 2 is in its OFF position and the first solenoid 3 is not energized to set the battery relay 4 in operation. As no electric current is, therefore, supplied to the brake system, the parking brake continues to function, even if the parking brake switch 5 is turned manually to the ON contact 5b for deactuating the parking brake.

Figure 8:
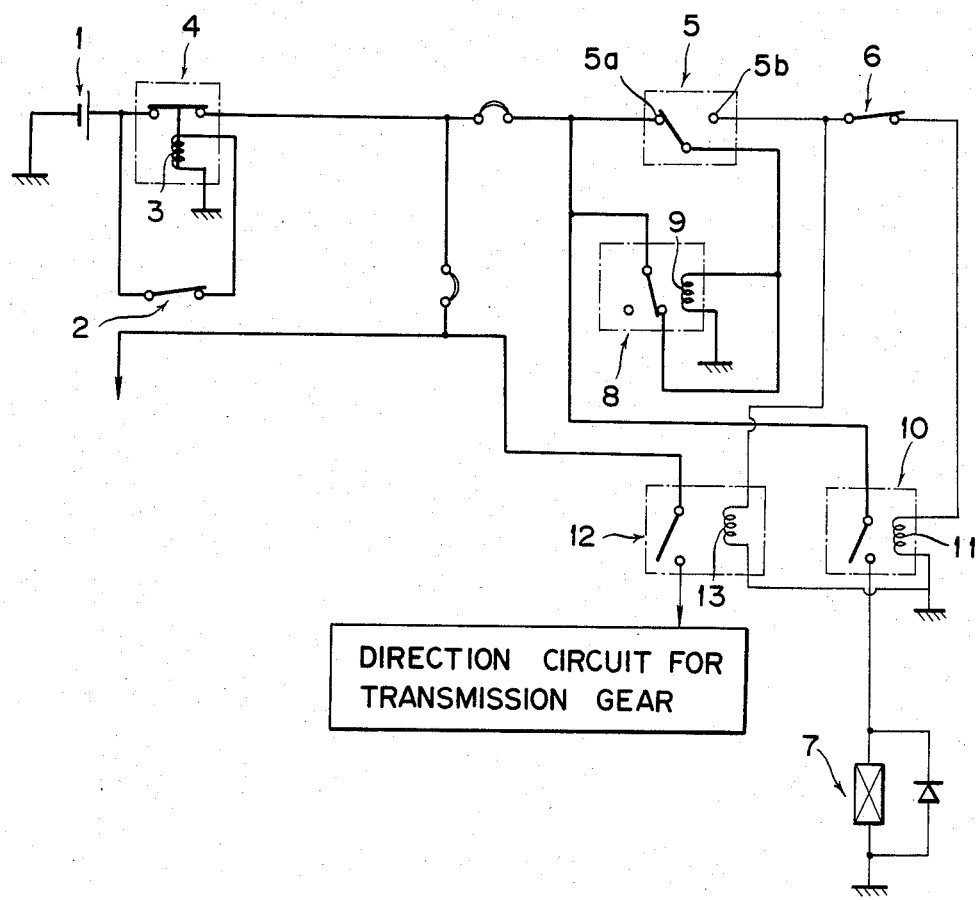
FIGS. 8 to 10 are block diagrams showing the operation of the brake system shown in FIG. 7.

The main switch 2 is, then, turned on to energize the solenoid 3 and thereby set the battery relay 4 in operation, as shown in FIG. 8. If the parking brake switch 5 is turned manually to the OFF contact 5a, the holding relay 8 is set in operation and holds itself in operation.

Figure 9:
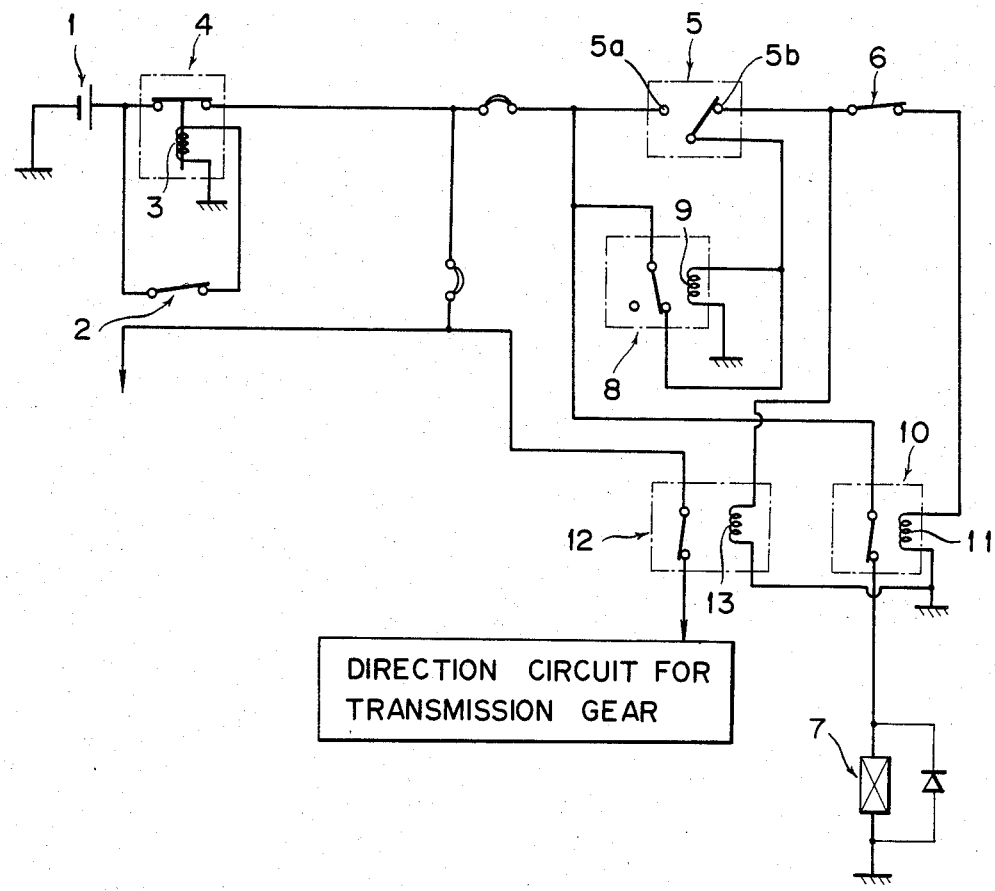

If the parking brake switch 5 is, then, turned to the ON contact 5b manually, an electric current flows through the holding relay 8 to energize the third and fourth solenoids 11 and 13 and thereby set the parking brake relay 10 and the neutralizer relay 12, respectively, in operation, as shown in FIG. 9. The current flows to the solenoid valve 7, whereupon the parking brake is deactuated. It also flows to the direction circuit for the transmission gear so that the speed of the vehicle may be variable. The vehicle is, therefore, ready to start as usual.

If an engine key is turned to stop the engine when the vehicle has been stopped after traveling from one place to another or after work, the main switch, which is operationally connected with the engine key, is turned off and all the solenoids are deenergized to set all the relays out of operation, whereupon the parking brake is automatically applied again. As the electric current ceases to flow to the direction circuit for the transmission gear, the transmission gear is shifted to its neutral position. It will be easily understood that the parking brake is likewise actuated automatically and the transmission gear shifted to its neutral position, if the parking brake switch 5 is manually turned to the OFF contact 5a again with the main switch intact.

Figure 10:
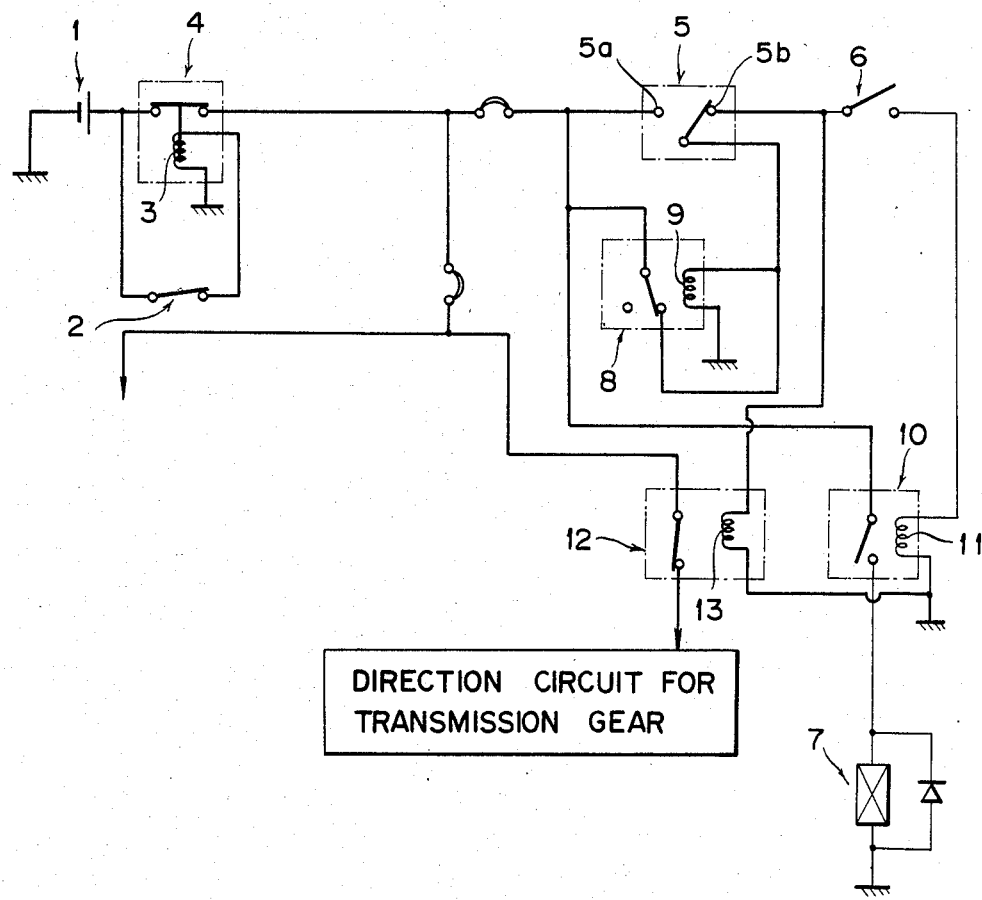

Should anything wrong happen to the brake system with a resultant pressure drop in a wet tank while the vehicle is running, the emergency brake switch 6 is turned off and the third solenoid 11 is deenergized to open the parking brake relay 10, as shown in FIG. 10, whereupon the parking brake functions as an emergency brake to stop the vehicle immediately. Even in any such case, however, the neutralizer relay 12 remains closed and enables the vehicle to start at a varied speed. Therefore, there is no fear of any serious accident even if the vehicle may be brought to an emergency stop, for example, on a railroad crossing. The vehicle can be started at a lower speed by overcoming the action of the parking brake to get away from the crossing for itself.

Figure 11:
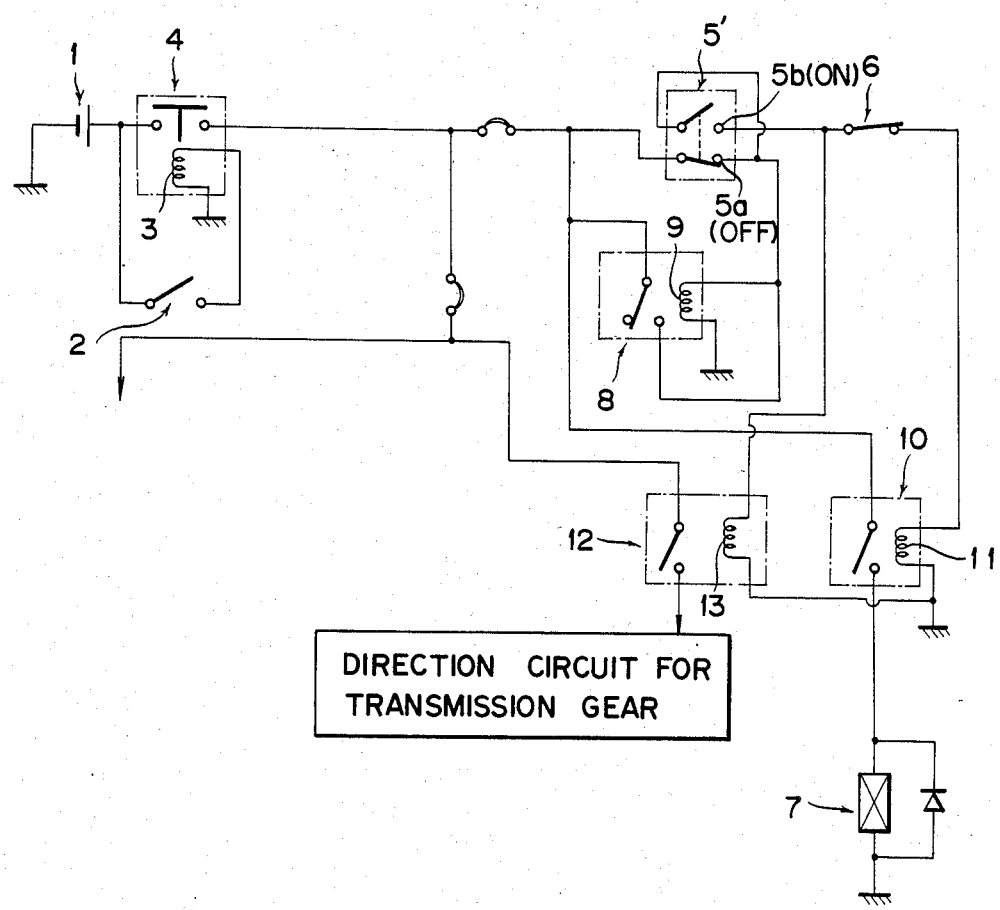
FIG. 11 is a block diagram showing a modified form of the brake system shown in FIG. 7.

In FIG. 11, a modified form of the brake system shown in FIG. 7 is shown. This modification differs from the embodiment shown in FIG. 7 only in that it includes a parking switch 5' of the interlocking type having four contacts and two contact pieces. Otherwise, it is identical to the embodiment shown in FIG. 7.

Figure 12:
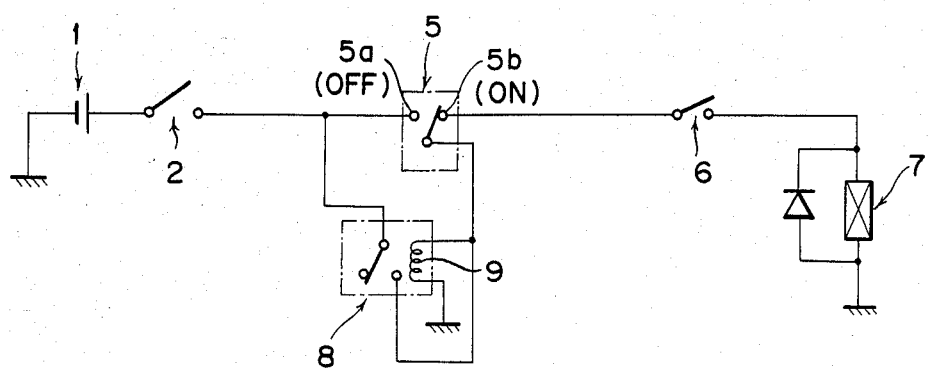
FIG. 12 is a block diagram showing another modified form of the brake system shown in FIG. 1.
Figure 13:
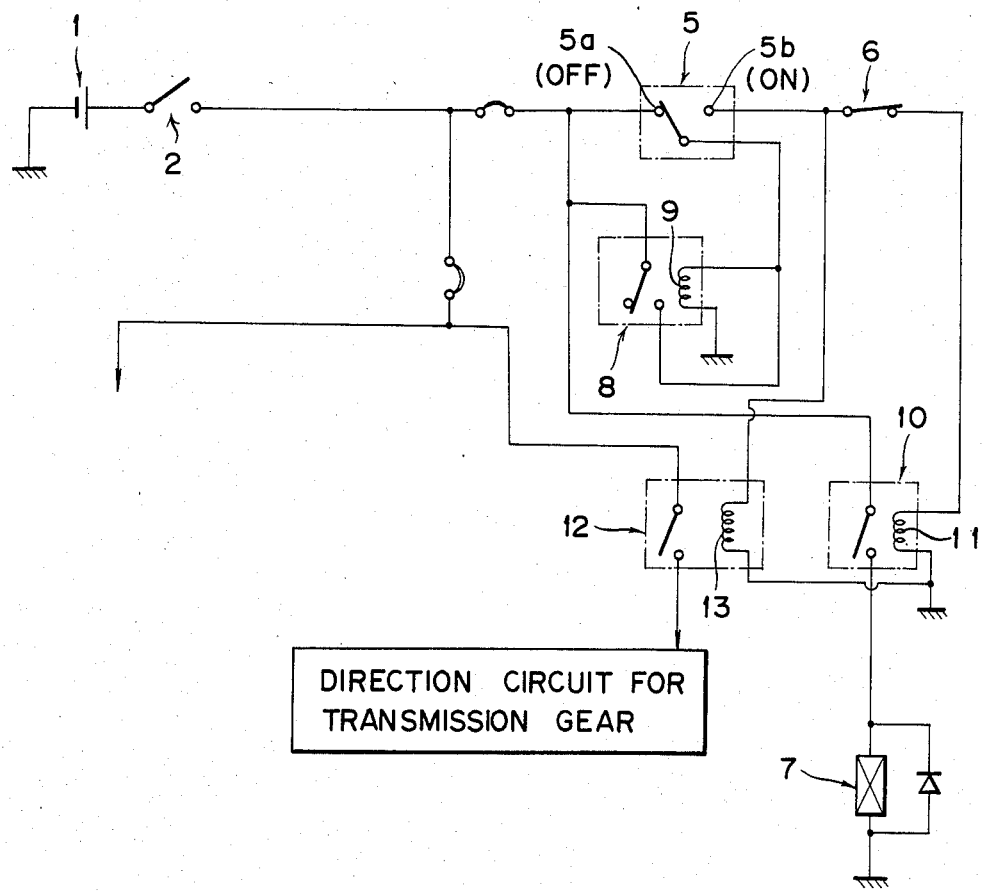
FIG. 13 is a block diagram showing another modified form of the brake system shown in FIG. 7.

In FIGS. 12 and 13, respective another modifications of the foregoing embodiments shown in FIGS. 1 and 7. Each of the modifications is not provided in the main switch 2 with the battery relay, because the main switch 2 itself has a sufficiently large current capacity. Even if the battery relay is omitted, these modifications can perform the identical operations achieved by the embodiments shown in FIGS. 1 and 7 described previously.

It is to be understood that the foregoing description is merely illustrative of the preferred embodiments of this invention and that the scope of the invention is not limited thereto. Additional modifications or alterations of the invention will readily occur to one skilled in the art without departing from the scope of the invention.

What is claimed is:

1. A brake system for a construction vehicle, comprising:
   (a) a main switch;
   (b) an emergency brake switch and a solenoid valve for a parking brake which are connected in series to a power source via said main switch one after the other;
   (c) a parking brake switch connected in series between said main switch and said emergency brake switch for energizing said solenoid valve to deactuate said parking brake when it has been turned on;
   (d) a holding relay having a solenoid which is energized if said parking brake switch is turned off, and thereby sets said holding relay in operation to hold said holding relay in a position in which an electric current can flow therethrough and to allow an electric current to flow through said parking brake switch if said parking brake switch is subsequently turned on;
   (e) a parking brake relay connected between a battery relay and said solenoid valve and having a solenoid which is energized if said emergency brake swtich is turned on when said parking brake switch is in said position; and
   (f) a neutralizer relay connected between said battery relay and a direction circuit for a transmission gear in said vehicle and having a solenoid which is energized when said parking brake switch is in said position.

2. A brake system as set forth in claim 2, further wherein said battery relay has a solenoid which is energized to set said battery relay in operation if said main switch is turned on.

3. A brake system as set forth in claim 1, wherein said parking brake switch is a switch of the interlocking type having four contacts and two contact pieces.

4. A brake system as set forth in claim 2, wherein said parking brake switch is a switch of the interlocking type having four contacts and two contact pieces.

* * * * *